US009507775B1

(12) United States Patent
Niles

(10) Patent No.: US 9,507,775 B1
(45) Date of Patent: Nov. 29, 2016

(54) SYSTEM FOR AUTOMATICALLY CHANGING LANGUAGE OF A TRAVELER'S TEMPORARY HABITATION BY REFERENCING A PERSONAL ELECTRONIC DEVICE OF THE TRAVELER

(71) Applicant: James E. Niles, New York, NY (US)

(72) Inventor: James E. Niles, New York, NY (US)

(*) Notice: Subject to any disclaimer, the term of this patent is extended or adjusted under 35 U.S.C. 154(b) by 0 days.

(21) Appl. No.: 14/670,738

(22) Filed: Mar. 27, 2015

Related U.S. Application Data

(63) Continuation-in-part of application No. 14/516,750, filed on Oct. 17, 2014.

(60) Provisional application No. 62/086,007, filed on Dec. 1, 2014.

(51) Int. Cl.
*G06Q 40/00* (2012.01)
*G06F 17/28* (2006.01)
*G06F 17/27* (2006.01)

(52) U.S. Cl.
CPC .......... *G06F 17/289* (2013.01); *G06F 17/275* (2013.01)

(58) Field of Classification Search
None
See application file for complete search history.

(56) References Cited

U.S. PATENT DOCUMENTS

| | | | |
|---|---|---|---|
| 7,480,546 B2 | 1/2009 | Kamdar et al. | |
| 8,386,231 B2 | 2/2013 | LeBeau et al. | |
| 8,494,838 B2 | 7/2013 | Donabedian et al. | |
| 8,761,513 B1 | 6/2014 | Rogowski et al. | |
| 8,897,423 B2 | 11/2014 | Nanjundaswamy | |
| 2003/0149576 A1 | 8/2003 | Sunyich | |
| 2003/0202683 A1 | 10/2003 | Ma et al. | |
| 2004/0210444 A1 | 10/2004 | Arenburg et al. | |
| 2005/0051620 A1* | 3/2005 | DiLuoffo | G07F 7/08 235/382 |
| 2007/0226019 A1* | 9/2007 | Carlson | G06Q 50/12 705/5 |
| 2009/0285445 A1 | 11/2009 | Vasa | |
| 2012/0028680 A1 | 2/2012 | Breed | |
| 2012/0035908 A1 | 2/2012 | Lebeau et al. | |
| 2013/0282360 A1 | 10/2013 | Shimota et al. | |
| 2013/0346061 A1 | 12/2013 | Donabedian et al. | |
| 2014/0014720 A1* | 1/2014 | Sarkis, Jr. | G06Q 50/22 235/382 |
| 2014/0156257 A1* | 6/2014 | Jephcott | A61B 5/7465 704/2 |

FOREIGN PATENT DOCUMENTS

| | | |
|---|---|---|
| EP | 1359557 | 2/2003 |
| EP | 2 495 960 A1 | 9/2012 |
| EP | 2 597 838 A1 | 5/2013 |
| EP | 2587389 | 5/2013 |
| WO | WO2009139783 | 11/2009 |
| WO | WO2012018802 | 2/2012 |
| WO | WO2013071004 | 5/2013 |
| WO | WO2014001937 | 1/2014 |
| WO | WO 2014/107793 A1 | 7/2014 |

* cited by examiner

*Primary Examiner* — Michael G Lee
*Assistant Examiner* — Tabitha Chedekel

(57) ABSTRACT

A traveler habitation language setting system, including a plurality of habitations, each habitation having at least one smart device having an active language, for use by a traveler having a native language and carrying a personal electronic device. Initially the system associates the personal electronic device of the traveler with one of the habitations. The system determines the native language of the traveler by contacting the personal electronic device and sets the active language of the smart device(s) for that habitation. Example habitations illustrated in the present disclosure include airplane seating locations that have seat back infotainment systems, and hotel rooms having television infotainment devices.

19 Claims, 7 Drawing Sheets

SYSTEM FOR AUTOMATICALLY CHANGING LANGUAGE OF A TRAVELER'S TEMPORARY HABITATION BY REFERENCING A PERSONAL ELECTRONIC DEVICE OF THE TRAVELER

CROSS REFERENCES AND RELATED SUBJECT MATTER

This application is a continuation-in-part of utility patent application Ser. No. 14/516,750, filed in the United States Patent Office on Oct. 17, 2014; and also is a non-provisional filing of subject matter contained in provisional patent application Ser. No. 62/086,007, filed in the United States Patent Office on Dec. 1, 2014.

TECHNICAL FIELD

The present disclosure relates generally to communication and interaction with travelers who may not speak or understand the language in the location they are visiting. More particularly, the present disclosing relates to a system and method for allowing travelers to change language settings of smart devices that form part of a temporary habitation for a traveler, automatically by referencing the default language of the traveler's smart phone, or other personal electronic device—thereby providing a seamless integration for the traveler.

BACKGROUND

Travelers now expect a full seamless user experience when traveling, which is the keystone of success for the travel/entertainment industry. In today's environment, more and more technological smart devices are being used to help travelers within a foreign country cope and manage information, but they do not provide a full user experience because of the different language and the barrier it can pose.

Manually setting the language of any smart device can be tricky, confusing, and time consuming as the user must navigate the never-ending menu selection, which in itself is in a different language to begin with. Many smart devices that travelers encounter have often been used by more than one person prior to them using it, which means that a language may have been set that is neither the default device language, nor in the traveler's native language which can cause more frustration.

Considering that millions of people travel internationally each year to countries where languages other than their own are spoken, displayed, or written, it is a frequent occurrence that travelers are unable to understand the information that is provided, to act appropriately. Accordingly, the mismatch between travelers and the information could be a big safety concern, as travelers may not understand evacuation routes or other warning messages, which are provided for their safety.

While the travel/entertainment industries have attempted to provide travelers a complete user experience, they have fallen short because of the foreign language barrier. Thus, while these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system and method for automatically setting an active language for a traveler habitation and related smart devices and/or internet of things devices, which a traveler may encounter, and have the device active language of such devices set as the traveler's native language. Providing navigation, information, and messages from smart devices to the traveler in their native language then produces a complete, seamless, and integrated user experience.

It is another aspect of an example embodiment in the present disclosure to provide a system where multiple smart devices are present in the traveler's habitation, and all such smart devices are automatically set to the traveler's native language. Accordingly, the active language of one of the smart devices may be set by reference to the smart phone or other personal electronic device carried by the traveler to determine a language preference of the traveler. Subsequently, other smart devices may communicate with each other to convey the language preference of the traveler.

It is another aspect of an example embodiment in the present disclosure to provide a fulfilling user experience to the traveler by having seamless integration of smart devices. When connection between the traveler's personal electronic device and other smart devices is made and the traveler's native language is set automatically, then the traveler user experience is fulfilling. Seamless integration happens when a traveler's smart phone or personal electronic device communicates with the habitation system and the smart devices and/or internet of things devices encompassed thereby. Such communication may occur by any other network communication system, which allows connectivity between the habitation system and the personal electronic device of the traveler. Transceiver sensors connected to smart devices and/or the networked habitation system may initiate the communication between traveler smart phone/portable electronic device and other smart devices and/or internet of things devices. Connectivity may require that a traveler place their personal electronic device near and/or on the other smart devices or transceiver sensors, or may require that smart devices tap each other briefly. Connectivity may require that a smart device have an IP Address as a unique identifier or another form of a device unique identifier so that the devices can communicate with each other. If smart devices detect multiple languages during connectivity, then the traveler may be prompted to select a preferred language to complete setting the active language on the smart device or habitation system.

It is yet another aspect of an example embodiment to determine the preferred language of the traveler when the default language of the personal electronic device cannot be determined. Accordingly, scanning email or text message on traveler's personal electronic device to detect examples of native language usage may also be used in determining the preferred language. Additionally, traveler's default native language may be stored as a preference with the operating system of the personal electronic device or within an app on the personal electronic device.

The present disclosure describes a traveler habitation language setting system, including a plurality of habitations, each habitation having at least one smart device having an active language, for use by a traveler having a native language and carrying a personal electronic device. Initially the system associates the personal electronic device of the traveler with one of the habitations. The system determines the native language of the traveler by contacting the personal electronic device and sets the active language of the smart device(s) for that habitation. Example habitations illustrated in the present disclosure include airplane seating locations that have seat back infotainment systems, and hotel rooms having television infotainment devices.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form described in the accompanying text. Attention is called to the fact, however, such description is illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

What follows are descriptions of various scenarios and embodiments that follow the principles of the present disclosure. As appropriate throughout these examples, a smartphone or portable electronic device carried by the traveler is used to determine the language preference/native language of the traveler, which is then used to set the active language of other smart devices.

Figure 1:
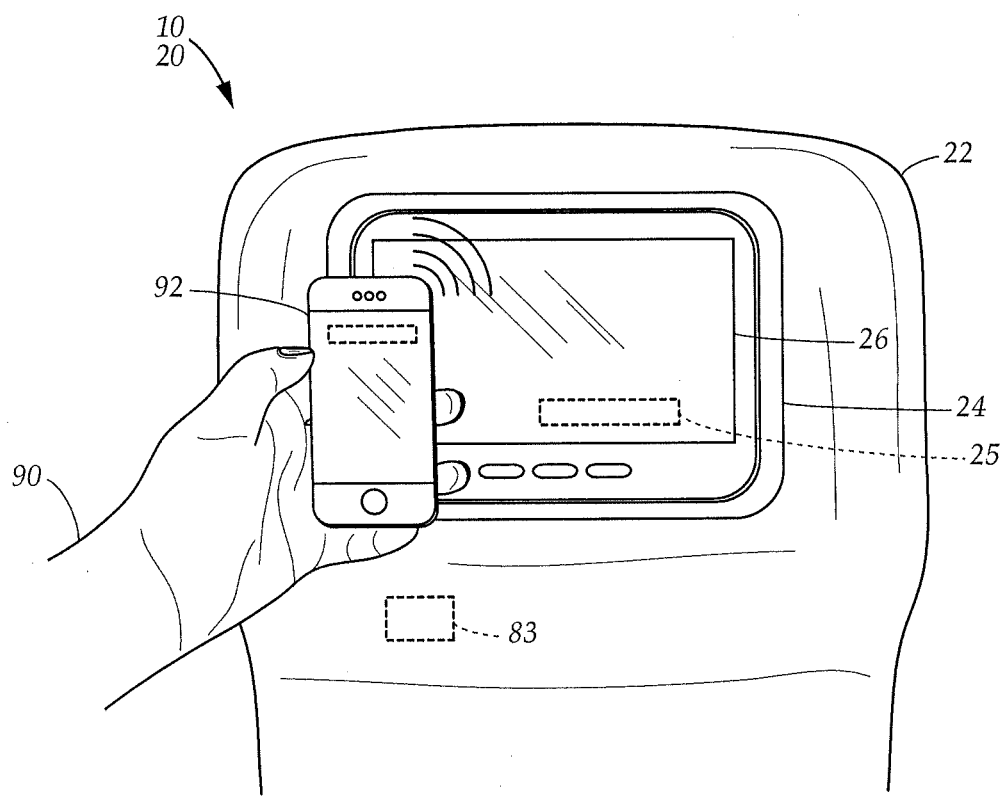
FIG. 1 illustrates an example embodiment of a traveler habitation, namely an airplane seating location having a seat back infotainment system, wherein a personal electronic device of a traveler is used to set the active language of the infotainment system.

FIG. 1 illustrates a traveler 90 in a travel habitation 10. The habitation generally forms part of a larger, habitation system. For example, the travel habitation illustrated is an airline seating location 20, which may be one of many seating locations 20 contained on an airplane. The airline seating location 20 may also be a seating location on a train, bus, boat, or other conveyance. As illustrated in FIG. 1, the airline seating location includes a seat back 22, which would typically be immediately in front of the traveler and may also be a panel or bulkhead immediately in front of the traveler. The seat back 22 has an infotainment system 24, including a touch screen 26. The infotainment system 24 generally provides information, messages 25 and entertainment to the traveler using the touch screen 26 and typically also through an audio interface, headphone jack, and headphones (not shown in FIG. 1). The infotainment system 24 is capable of providing messages and programming/content in several languages, as well as providing menus, navigation, and receiving commands in several languages. Accordingly, the infotainment system 24 has an active language setting for determining which language to provide such programming, menus, navigation, messages, and information. In accordance with the principles of the present disclosure, the user 90 has a native language, and has a personal electronic device 92, which in this example is a smartphone. The personal electronic device 92 may be a smartphone, tablet, or other device habitually carried and used by the traveler. The personal electronic device preferably has a user selected language setting, which may be part of the operating system, be set in an application, or otherwise determinable from the personal electronic device. In addition, the personal electronic device has other applications, such as text messaging and emailing, which allow the traveler to communicate with other personal electronic devices, and which contain examples of previous communications and with the traveler occurring in the native language of the user. Further in accordance with the principles of the present disclosure, the personal electronic device 92 is used to set the active language setting of the infotainment system 24 so that the infotainment system provides messages and programming to the traveler 90 in the native language of the traveler 90.

Figure 5:
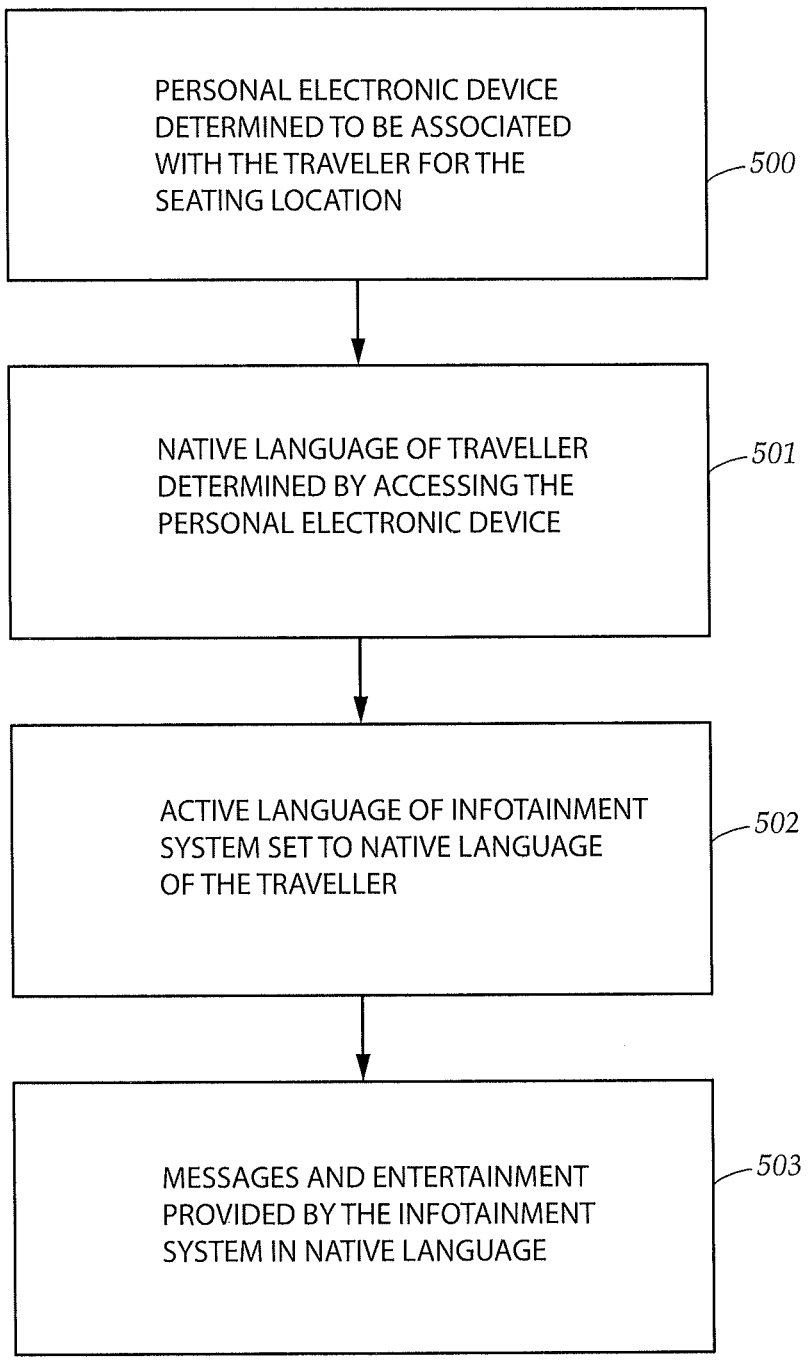
FIG. 5 is a flow chart, illustrating an aspect of the traveler habitation language setting system according to the principles of the present disclosure, wherein the habitations are airplane seating locations.

Referring to FIG. 5, initially the personal electronic device is determined by the habitation system to be associated with the traveler for the seating location at step 500. Any suitable communication protocol may be used to contact, communicate with and/or interrogate the personal electronic device, including but not limited to BLUETOOTH, WiFi, BEACON, RFID or other near-field communication scheme, optical/infrared, and any other communication protocol currently or prospectively available that allows the described functionality to be carried out. Such communication might-require pairing or other authorization to allow access to the personal electronic device by the habitation system. Once a suitable connection is made, the native language of the traveler is determined by accessing the personal electronic device at step 501, which may include reading or otherwise receiving the language setting of the personal electronic device, or using an algorithm to assess the likely native language by reviewing communications on the personal electronic device. Then, the active language setting of the infotainment system is set to be the same as the language setting of the personal electronic device at step 502. Accordingly, at step 503 messages and entertainment are provided by the infotainment system in the native language.

Note that the step of determining that the personal electronic device is associated with the traveler at 500 may include an assessment based on proximity of the personal electronic device to the infotainment system 24 or the seating location 20 (FIG. 1). Such may be comparative, wherein the nearest personal electronic device to the infotainment system 24 or the seating location 20 is deemed to belong to the traveler, or it may be absolute, where the personal electronic device is deemed to belong to the traveler when situated within a specific location or range of locations. It may also be assessed upon tapping the personal electronic device against the infotainment system, or at some other predetermined place within the seating location.

In addition, the step at 500 of determining that the personal electronic device is associated with the traveler for the seating location 500 (FIG. 5) may be determined prior to the traveler reaching the seating location. For example, in FIG. 2, the traveler 90 is located at a boarding gate 30 having a boarding gate scanner 32. The boarding gate 30 is located adjacent to the airplane having the seating location 20 (FIG. 1). Note that when the boarding gate 30 scans a boarding pass of the user, either electronically using the personal electronic device 92, or by scanning a paper boarding pass, a seating location for that traveler is instantly known by the system. Accordingly, at substantially that same moment, the step 501 of determining the native language of the traveler by accessing the personal electronic device (FIG. 5) may be performed, as well as the step 502 of setting the active language setting of the infotainment system to the active language of the traveler. Accordingly, when the traveler 90 reaches the seating location 20 (FIG. 1), the active language has already been set to the native language of the traveler, and the traveler may be greeted by messages in his/her native language.

By establishing a language for the seating location, a traveler can have the unique travel experience and still understand information that is presented in their native language. With correct native language established, the infotainment center will automatically change the menu selection into the traveler's native language. In addition, movies or shows may have the close captions option displayed in the traveler's native language and/or may even broadcast shows/movies in the native language. Safety/emergency information may be displayed on the infotainment center or pushed to traveler's personal electronic device in their native language. Inflight service menu may display in or be pushed to traveler's personal electronic device in their native language. Infotainment center may display (audio or visual) information such as news media, weather, and navigation maps in traveler's native language or may be pushed to traveler's smart device in their native language. In addition, the inflight shopping may be displayed on the infotainment center or pushed to traveler's personal electronic device in their native language and may allow for purchase transaction in traveler's native language. When the traveler exits the plane, infotainment center and/or other smart device associated with the seating location may default back to an initial default language and the seating location can be available for next passenger.

Figure 3:
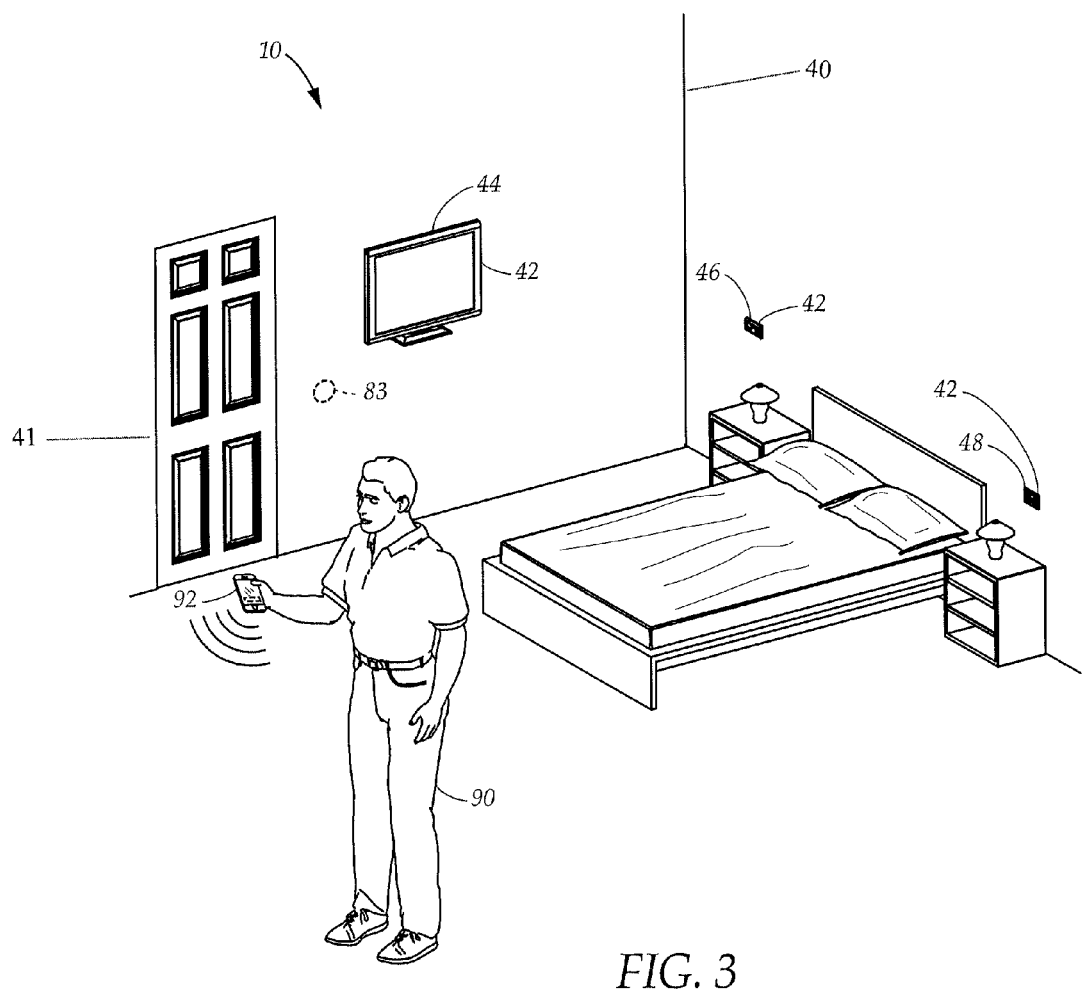
FIG. 3 illustrates another example embodiment of a traveler habitation, namely, a hotel room containing smart devices for the convenience of the traveler, wherein the personal electronic device of the traveler is used to set the active language of the smart devices.

Referring to FIG. 3, another embodiment is illustrated wherein the traveler habitation 10 is a hotel room 40. The hotel room may be one of many habitations contained within a traditional hotel, and may also be a rental house, cruise ship cabin, or the like. As illustrated, the traveler 90 has entered the hotel room 40 through a door 41 with the personal electronic device 92 associated with the traveler 90. The hotel room 40 has smart devices 42, including a television infotainment system 44, a thermostat 46, and lighting control 48. Note that the television infotainment system need not be strictly interpreted as the display seen on the wall, but may include a networked infotainment server/client that may or may not be connected to such a display. The smart devices provide messages, information, and entertainment to the traveler 90. Other examples of smart devices potentially within the hotel room 40 include a room telephone, radio, microwave, mini-bar/refrigeration unit, clock, washer/dryer, and exercise machines. Each of the smart devices 42 have an active language setting. Note that the smart devices 42 may be networked, with "internet of things" interconnectivity. As such, the devices collectively have a habitation language or room language, which is the preferred or native language of the traveler. Once determined, the room language may be used to set the active language of all of the smart devices 42 that the traveler 90 interacts with in the hotel room. In accordance with the principles of the present disclosure, the personal electronic device 92 is accessed or referenced to determine the native language of the traveler 90, and to set the active language setting of the smart devices to be the native language of the traveler 90.

Figure 6:
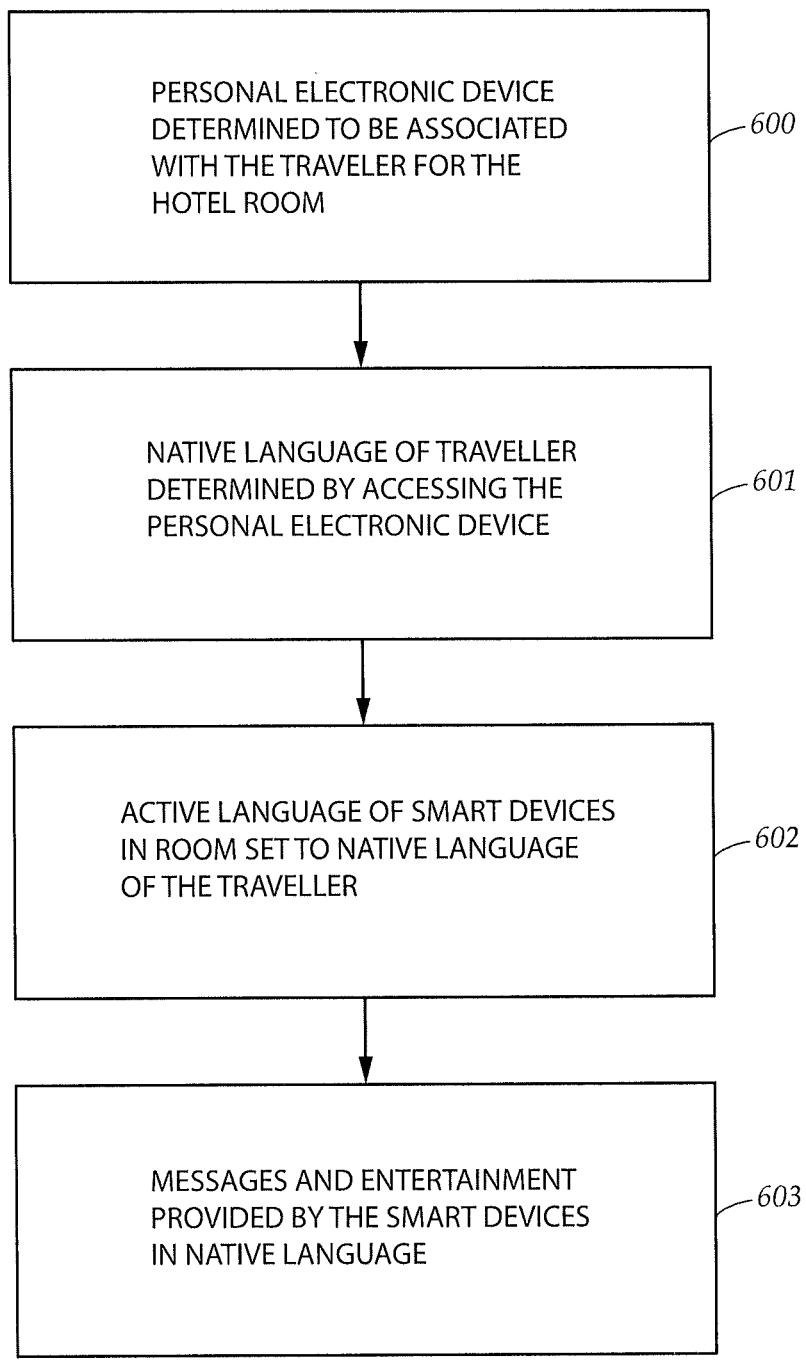
FIG. 6 is a flow chart, illustrating an aspect of the traveler habitation language setting system, wherein the habitations are hotel rooms.

Referring to FIG. 6, initially, at step 600, the personal electronic device is determined by the system to be associated with the traveler for the hotel room. Then, at 601, the native language of the traveler is determined by accessing the personal electronic device of the traveler. Then the active language setting of the smart devices in the hotel room is set to be the same as the language setting of the personal electronic device at step 602. Then, at step 603, messages and entertainment are provided by the smart devices in the native language.

Note that the step 600 of determining that the personal electronic device is associated with the traveler may include an assessment based on proximity of the personal electronic device to the hotel room 40 or smart devices 42 therein (FIG. 3). Such may be comparative, wherein the nearest personal electronic device to the hotel room or the door 41 at the time of entry is deemed to belong to the traveler, or it may be absolute, where the personal electronic device is deemed to belong to the traveler when situated within a specific location or range of locations. It may also be assessed upon performing a trigger event, such as via tapping the personal electronic device against the door 41 upon entry, or at some other predetermined place within the hotel room 40.

In addition, the step 600 of determining that the personal electronic device is associated with the traveler for the hotel room (FIG. 5) may be determined prior to the traveler reaching the hotel room. For example, in FIG. 4, the traveler 90 is located at a hotel check-in desk 34 having a check-in terminal 35, and a check-in agent 36. Note that when the check-in terminal 35 is used to associate a specific hotel room with the traveler 90, either electronically using the personal electronic device 92, or manually by the check-in agent 36 operating the check-in system, the specific hotel room for that traveler is instantly known by the system. Accordingly, the check-in terminal 35 may be in any configuration that accomplishes this functionality, and need not be a terminal in the traditional sense of a device with a keyboard and screen. Based on proximity to the check-in desk 34 and check-in terminal 35 or by other means, it is determined at step 600 that the personal electronic device is associated with the traveler (FIG. 6). Accordingly, the step 601 of determining the native language of the traveler is enabled by accessing the personal electronic device 90 may be performed, as well as the step 602 of setting the active language setting of the smart devices of the hotel room to the active language of the traveler 90. Accordingly, when the traveler 90 reaches the hotel room 40 (FIG. 3), the active language has already been set to the native language of the traveler, and the traveler may be greeted by messages in his/her native language.

By establishing a room/space language, a traveler can have the unique travel experience and still understand information that is presented in their native language. Several possible examples of information that can be presented in traveler's native language, are that the television infotainment system will automatically change the close captions option into the traveler's preferred language and/or may even broadcast shows in his/her native language. Safety/emergency information may be displayed or pushed to traveler's personal electronic device in their native language. Room service menu may be displayed in traveler's language or pushed to traveler's personal electronic device in his/her native language. Infotainment center may display (audio or visual) information such as news media, weather, and navigation maps in traveler's native language or may be pushed to traveler's personal electronic device in their native language. When traveler exits room and traveler is no longer coming back to room (i.e., has checked out), the active language of the smart devices may default back to a default language and the smart devices in the room are then ready for the next traveler.

Figure 2:
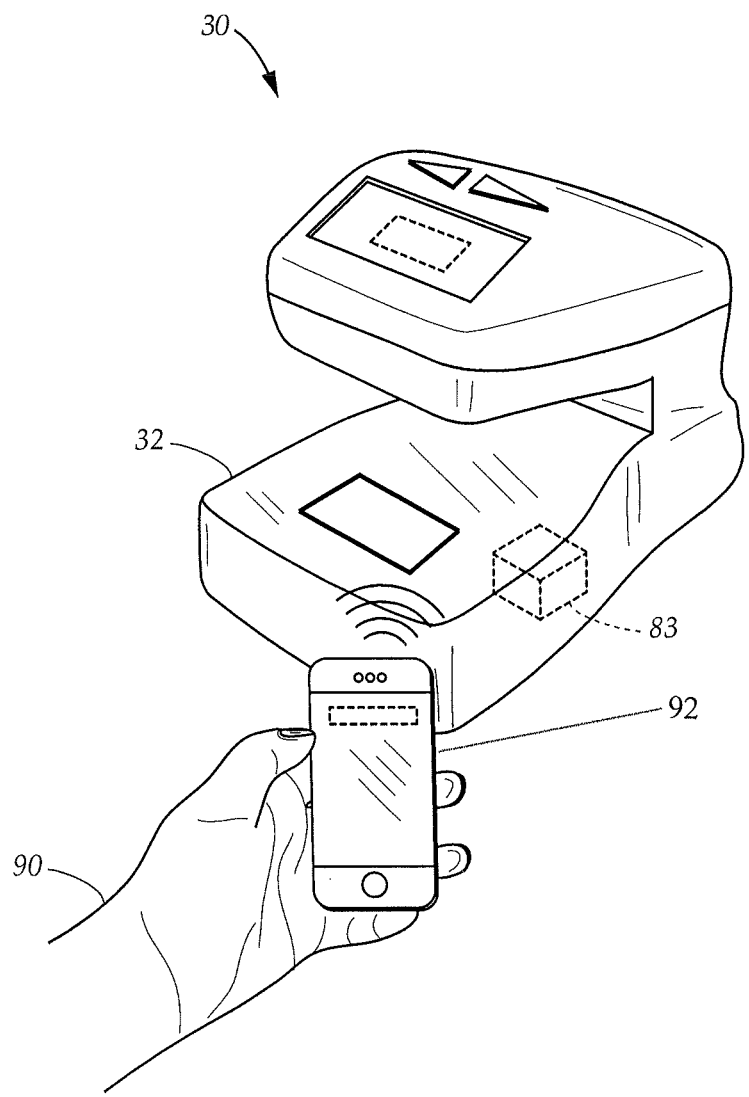
FIG. 2 illustrates an example embodiment of traveler habitation assignment occurring simultaneously with active language setting of that habitation using the personal electronic device of the traveler, wherein seat assignment for the traveler corresponds with assessment of the native language of the traveler by reference to a personal electronic device of the traveler and setting the active language of the infotainment system at that seating location.
Figure 4:
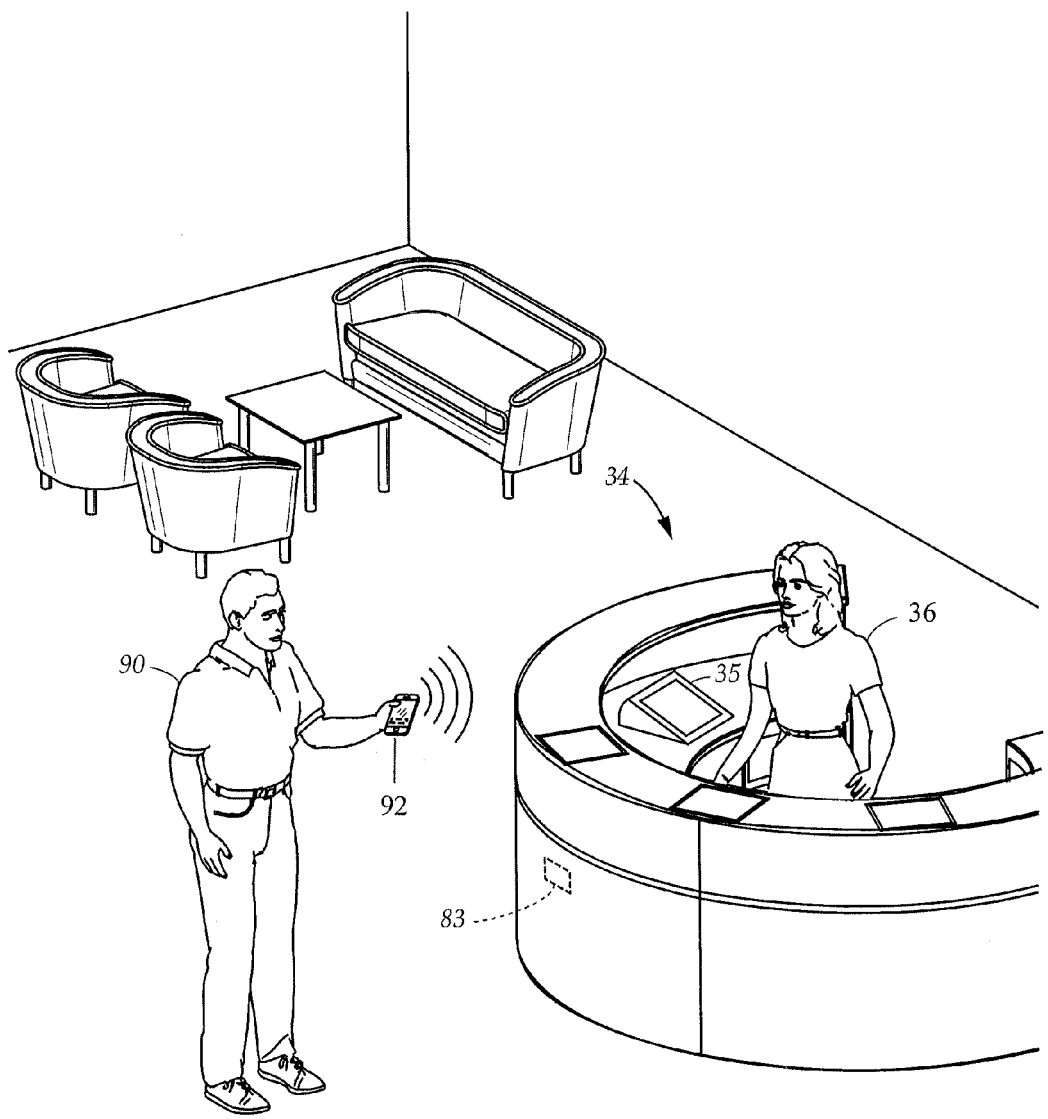
FIG. 4 illustrates an example embodiment of a traveler habitation assignment occurring simultaneously with active language setting of that habitation using the personal electronic device of the traveler, wherein room assignment for the traveler corresponds with assessment of the native language of the traveler by reference to personal electronic device of the traveler, and setting the active language of the personal electronic devices within the assigned room.
Figure 7:
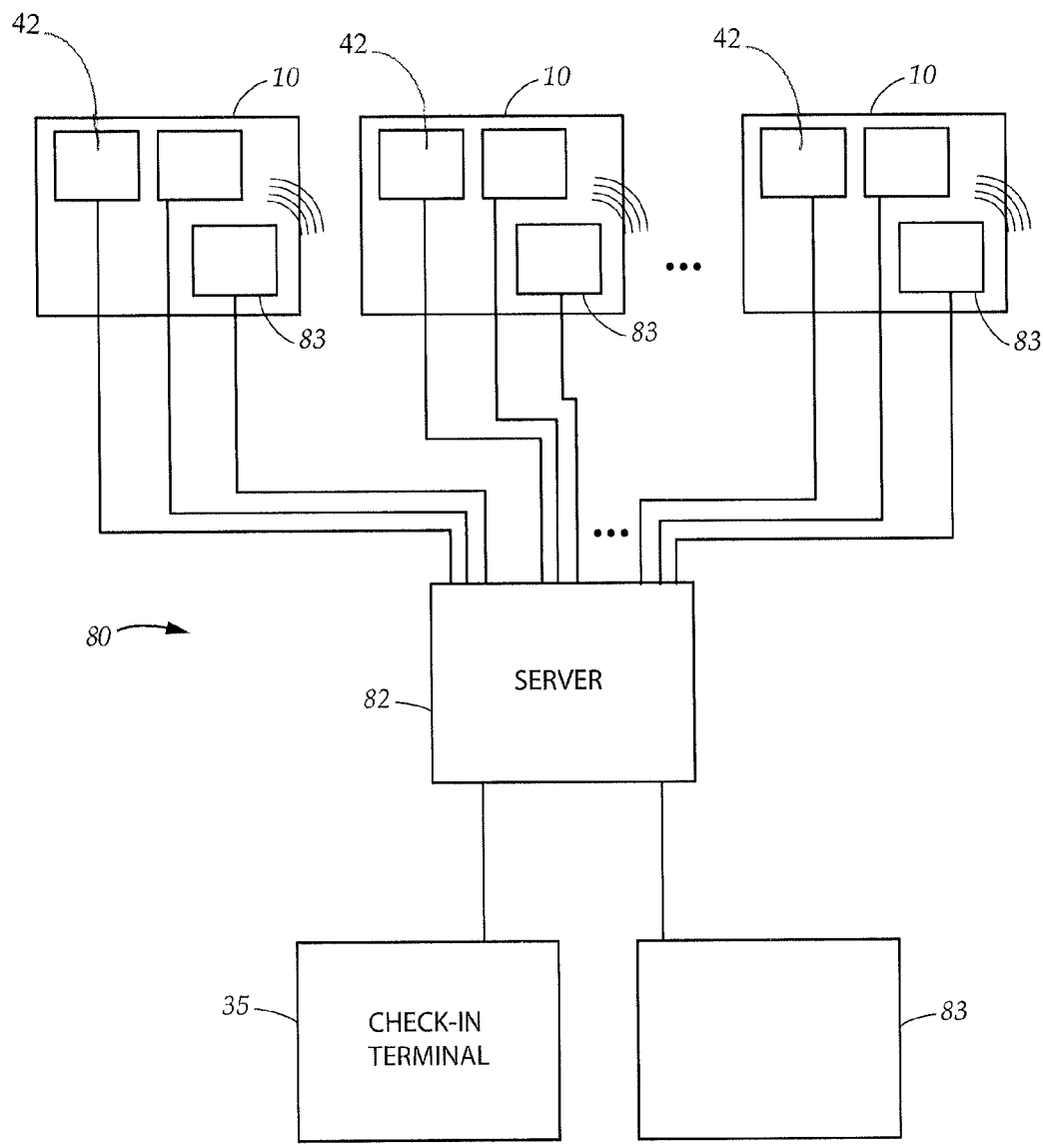
FIG. 7 is a functional block diagram, illustrating networked, interconnected habitations in accordance with principles of the present disclosure.

FIG. 7 illustrates connectivity of various components of a networked, interconnected habitation system 80. In particular, the system includes a plurality of habitations 10. Each habitation has at least one smart device 42. The smart devices 42 of each habitation are connected to a server 82. The check-in terminal. 35 is also connected to the server. At least one transceiver sensor 83 is provided to communicate with the personal electronic device 92 of the traveler (see F161 and F163). The transceiver sensors 83 may be provided at each habitation 10 (FIG. 1 and FIG. 3) and/or may be provided in proximity to the check-in terminal 35 or boarding gate scanner 32 (FIG. 2 and FIG. 4). The connectivity shown in FIG. 7 may apply to the hotel embodiment shown in FIG. 3 and FIG. 4, to the airplane embodiment shown in FIG. 1 and FIG. 2, and to other temporary habitations that a traveler may visit. With regard to the airplane embodiment, the seating location 20 of FIG. 1 may be considered analogous to the habitation 10 of FIG. 7, the infotainment system 24 of FIG. 1 may be considered a smart device, analogous to one of the smart devices 42 in FIG. 7, and the boarding gate scanner 32 of FIG. 2 may be considered to be analogous to the check-in system terminal 35 of FIG. 7. Accordingly, FIG. 7 illustrates one topology for how the components may be networked. In addition, the transceiver sensors 83 may be associated with and directly connected to each smart device 42, such that the association of the personal electronic device with the traveler, determination of the active language of the personal electronic device, and setting of the active language happens at the smart device itself. Subsequently, the native language may be communicated to other smart devices in the habitation to appropriately set their own active language to the native language of the traveler.

Although the above-preferred examples have been described with specificity toward traveler's experiences, persons skilled in this art will recognized that many changes to the specific examples disclosed above could be made without departing from the spirit of the invention. For example, automatically changing/controlling a smart devices language by another smart device language could be substituted with automatically changing/controlling internet of thing devices language by a user smart device default language.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated, herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system for automatically changing the smart device located within a traveler habitation by referencing a personal electronic device carried by the traveler. The disclosure is illustrated by example throughout the written description. It should be understood that numerous variations are possible, while adhering to the inventive concept. Such variations are contemplated as being a part of the present disclosure.

What is claimed is:

1. A system for automatically setting an active language within a habitation for use by a traveler intended to occupy said habitation, said traveler being in possession of a personal electronic device, said traveler having a native language, comprising:
   at least one travel habitation for accommodating at least one traveler within said at least one habitation,
   a smart device associated with said habitation, said smart device having a settable active language;
   at least one transceiver sensor associated with said habitation and said smart device for wirelessly connecting with the personal electronic device of the traveler to be accommodated within said habitation to determine the native language of said traveler from the personal electronic device possessed by said traveler; and
   a server, connected with said smart device said server being adapted to associate the habitation with said traveler, and said server being adapted to receive the native language determination of said traveler for said habitation from the at least one transceiver sensor, and said server adapted to automatically setting the active language of the smart device in said habitation to be said native language; and/or
   at least one smart device within said traveler habitation, capable of communicating the native language to other smart devices located in said traveler habitation.

2. The system as recited in claim 1, wherein the personal electronic device has a language setting which is set by the traveler to the native language of the traveler, and wherein the transceiver sensor obtains the language setting from said personal electronic device and/or determination of the active language of the personal electronic device and setting of the smart device active language happens at the smart device itself.

3. The system as recited in claim 2, wherein said at least one habitation is a plurality of hotel rooms located within a hotel, said hotel having a check-in device, connected to the server where said traveler is assigned to one of the hotel rooms, and wherein at least one transceiver sensor is located adjacent to the check-in device.

4. The system as recited in claim 3, wherein the at least one smart device of each habitation further comprises a television infotainment system.

5. The system as recited in claim 2, wherein said at least one habitation is a seating location within an airplane having a plurality of seating locations, said airplane having a boarding gate scanner connected to the server where the traveler is associated with one of the seating locations, and wherein at least one of the transceiver sensors is located adjacent to the boarding gate scanner.

6. The system as recited in claim 5, wherein the at least one smart device includes a seat back infotainment system.

7. A traveler habitation automatic language setting method for use with a plurality of temporary habitations that are part of a networked habitation systems, by a plurality of travelers, each traveler having a native language and carrying a personal electronic device, each habitation having at least one smart device having an active language setting, comprising the steps of:
   associating the personal electronic device of the travelers with one of the habitations;
   determining the native language of said travelers by contacting the personal electronic device by the networked habitation system;
   automatically setting the active language of the at least one smart device associated with said habitation to the native language of said travelers; and
   providing messages and information to the traveler in the active language.

8. The traveler habitation language setting method as recited in claim 7, wherein the personal electronic device has a language setting, and wherein the step of determining the native language of said traveler by contacting the personal electronic device further comprises determining the language setting of the personal electronic device.

9. The traveler habitation language setting method as recited in claim 8, wherein the networked system includes a check-in terminal and a transceiver sensor immediately adjacent to the check-in terminal; wherein the step of associating the personal electronic device of one of the travelers with one of the habitations further comprises contacting said personal electronic devices with the transceiver sensor adjacent to the check-in terminal; and wherein the step of determining the native language of said traveler by contacting the personal electronic device is performed by contacting the personal electronic device by said transceiver sensor.

10. The traveler habitation language setting method as recited in claim 9, wherein the habitations are hotel rooms that are part of a hotel having a check-in desk; wherein the check-in terminal and transceiver sensors are located at the check-in desk; and wherein the at least one smart device of each habitation further comprises a television infotainment system.

11. The traveler habitation language setting method as recited in claim 8, wherein the habitations are hotel rooms that are part of a hotel, wherein each habitation has a transceiver sensor; wherein the step of associating the personal electronic device of one of the travelers with one of the habitations further comprises contacting said personal electronic devices with the transceiver sensor at one of the habitations and associating the personal electronic device with that habitation; and wherein the step of determining the native language of said traveler by contacting the personal electronic device is performed by contacting the personal electronic device by said transceiver sensor.

12. The traveler habitation method as recited in claim 8, wherein the habitations are seating location on an airplane, wherein each habitation has a transceiver sensor and a seat back infotainment system; wherein the step of associating the personal electronic device of one of the travelers with one of the habitations further comprises contacting said personal electronic devices with the transceiver sensor at one of the habitations and associating the personal electronic device with that habitation; and wherein the step of determining the native language of said traveler by contacting the personal electronic device is performed by contacting the personal electronic device by said transceiver sensor.

13. The traveler habitation method as recited in claim 9, wherein the habitations are on an airplane, wherein the check-in terminal is a boarding gate scanner located at a boarding gate; wherein the boarding gate scanner and transceiver sensor are located at the boarding gate; and wherein the at least one smart device of each seating location further comprises an infotainment system.

14. A traveler habitation language setting method for use with a temporary habitation, by a traveler having a native language and carrying a personal electronic device, each said habitation having at least one smart device having an active language setting, comprising the steps of:
- associating the personal electronic device of the traveler with the habitation
- determining the native language of the traveler by contacting the personal electronic device by the at least one smart device in the habitation;
- setting the active language of the smart device associated with said habitation to the native language of the traveler; and
- providing messages and information to the traveler in the active language.

15. A traveler habitation language setting method as recited in claim 14, wherein the habitation has a transceiver sensor associated with the habitation and located nearby, and wherein the step of associating the personal electronic device of the traveler with the location further comprises entering the location by the traveler with the portable electronic device and contacting the personal electronic device by the transceiver sensor.

16. The traveler habitation language setting method as recited in claim 15, wherein the habitation is an airplane seating location, and wherein the at least one smart device includes an infotainment system.

17. The traveler habitation language setting method as recited in claim 16, wherein the portable electronic device has a language setting, and wherein the steps of determining the native language of the traveler by contacting the personal electronic device further comprises determining the language setting of the personal electronic device.

18. The traveler habitation language setting method as recited in claim 16, wherein the habitation is a hotel room, wherein the smart device include a television infotainment system.

19. The traveler habitation language setting method as recited in claim 18, wherein the portable electronic device has a language setting, and wherein the step of determining the native language of the traveler by contacting the personal electronic device further comprises determining the language setting of the personal electronic device.

\* \* \* \* \*